H. G. COLLINS.
LOCK.
APPLICATION FILED APR. 11, 1907.

899,955.

Patented Sept. 29, 1908.

Witness
J. S. Coleman
M. O. Williams

Inventor
Herbert G. Collins
by Beach & Fisher
Attorneys.

UNITED STATES PATENT OFFICE.

HERBERT G. COLLINS, OF NEW HAVEN, CONNECTICUT, ASSIGNOR TO SARGENT & COMPANY, OF NEW HAVEN, CONNECTICUT, A CORPORATION OF CONNECTICUT.

LOCK.

No. 899,955.  Specification of Letters Patent.  Patented Sept. 29, 1908.

Application filed April 11, 1907. Serial No. 367,480.

*To all whom it may concern:*

Be it known that I, HERBERT G. COLLINS, of the city and county of New Haven and State of Connecticut, have invented new and useful Improvements in Locks, of which the following is a full, clear, and exact description when taken in connection with the accompanying drawings.

This invention relates to locks, and more particularly to that class of locks known as escutcheon cylinder locks, in which a key or barrel is adapted to be rotated by a key inserted longitudinally therein.

The present invention is an improvement in the form of lock set forth and described in Letters Patent of the United States, #830,013, granted Sept. 4, 1906, to John H. Shaw, which lock is provided with a sleeve, with an eccentric bore for the key hub or barrel, together with suitable tumbler mechanism by which the hub or barrel may be rotated independently of the sleeve, or together with it.

This invention has for its object the production in such a lock of a bolt operating dog loosely mounted on the sleeve and slidably mounted on the hub or barrel, so that it may rotate with the hub or barrel independently of but concentrically with the sleeve. When the hub or barrel is rotated with the sleeve, the dog will be rotated therewith concentrically with the sleeve.

To these and other ends, the invention consists of the improvements and combinations of parts set forth and claimed hereinafter.

Figure 1:
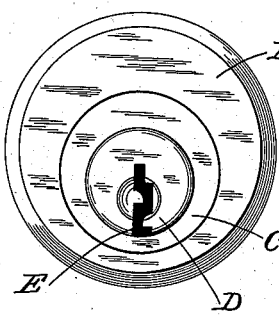
Figure 2:
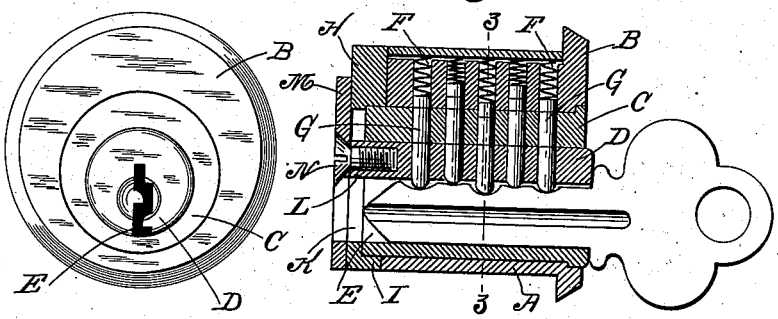
Figure 3:
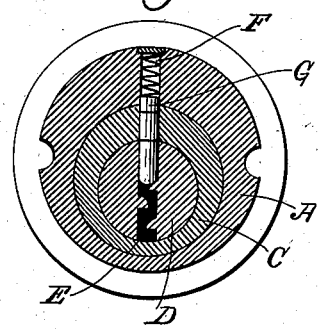
Figure 4:
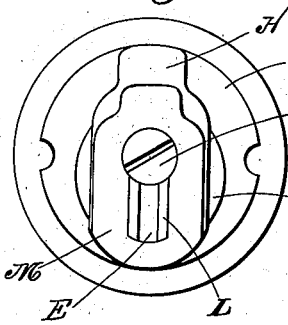
Figure 5:
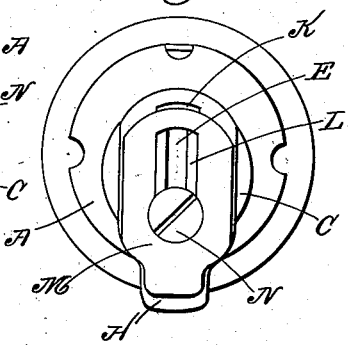
Figure 6:
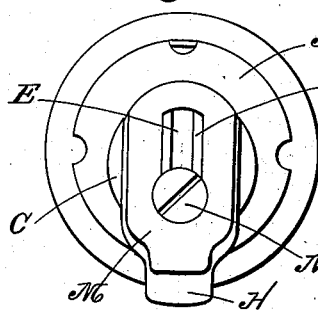
Figure 7:
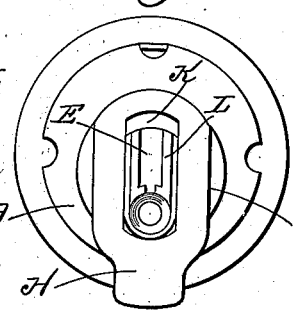
Figure 8:
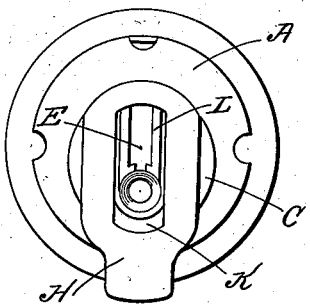
Figure 9:
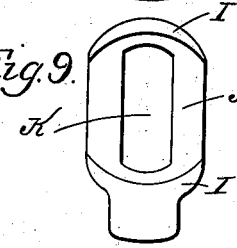

Referring to the drawings, Figure 1 represents a front elevation of a lock embodying the invention, Fig. 2, a longitudinal central vertical section through the same, Fig. 3, a transverse vertical section on line 3—3 of Fig. 2; Figs. 4, 5 and 6, rear views of the lock with the bolt operating dog and associated parts shown in different positions, Figs. 7 and 8, views similar to those shown in Figs. 5 and 6, respectively, with the plate or washer removed, and Fig. 9, an inside detail view of the bolt operating dog.

In all figures, similar letters of reference represent like parts.

The part designated by the letter A represents the casing of a cylinder lock, and B its face. In the casing A projects longitudinally a sleeve C having an eccentric bore for the hub or barrel D, with the usual slot E for the key or keys. As shown more particularly in Fig. 3, the axis of the sleeve C is above that of the hub or barrel D. Radial tumbler pockets F are provided in the casing A, sleeve C and hub D, for suitable tumbler mechanism G, consisting of tumblers and springs. This tumbler mechanism, as more particularly set forth in the patent referred to is constructed so that by the use of one key, the barrel D may be rotated independently of the sleeve C, as indicated in Figs. 2 and 3; while with another key, the tumbler pins may be so shifted that the barrel or hub will rotate with the sleeve in the casing A.

A bolt operating dog H is provided with depending flanges I, the inner faces of which are curved to correspond to the periphery of the sleeve C, so that the bolt operating dog H may be mounted on the rear end of the sleeve C, and is free to rotate independently thereon, but concentrically with the axis of the sleeve. Through the central portion of the bolt operating dog H is a longitudinal slot K through which projects a rear extension L of the barrel or hub D, so that upon the turning of the hub or barrel the bolt operating dog H will necessarily be rotated therewith. The slot K of the bolt operating dog H is somewhat greater than the length of the projection L, as shown more particularly in Figs. 7 and 8, so that the bolt operating dog is capable of a limited longitudinal movement on the extension L of the hub or barrel.

A plate or washer M is adapted to be fitted over the dog H, and be secured by means of a screw N, or other suitable means, to the extension L of the hub or barrel.

By this construction, when the hub or barrel D is rotated alone, the bolt operating dog H will be rotated therewith but eccentrically thereto. As the axis of rotation of the dog is that of the sleeve C which is above the axis of rotation of the barrel or hub D, the projection L will move in the slot K in the dog from the position shown in Fig. 4 to that shown in Figs. 5 and 7. When, however, the sleeve C and barrel or hub are rotated together, the bolt operating dog is rotated on the axis of rotation of the sleeve and the extension of the hub remains in the same position in the sleeve, as shown more particularly in Figs. 6 and 8.

Having now described my invention, what

I claim and desire to secure by Letters Patent, is:—

In a lock the combination with a casing of a rotary key barrel or hub, a sleeve loosely mounted in said casing to rotate therein, and having an eccentric bore for said barrel or hub, a bolt operating dog having a direct transverse sliding connection with the barrel or hub, and an independent rotary connection with the sleeve and tumbler mechanism for locking said sleeve and barrel or hub to rotate together or permitting said barrel or hub to rotate independently, substantially as described.

In witness whereof, I have hereunto set my hand on the 9th day of April, 1907.

HERBERT G. COLLINS.

Witnesses:
FRANCES M. VALENTINE,
GEORGE H. CLOSE.